United States Patent [19]

Rogers et al.

[11] Patent Number: 5,064,526

[45] Date of Patent: Nov. 12, 1991

[54] METHOD FOR THE BASE-CATALYZED DECOMPOSITION OF HALOGENATED AND NON-HALOGENATED ORGANIC COMPOUNDS IN A CONTAMINATED MEDIUM

[75] Inventors: Charles J. Rogers; Alfred Kornel, both of Cincinnati; Harold L. Sparks, Fayetteville, all of Ohio

[73] Assignee: The United States of America as represented by the Administrator of the Environmental Protection Agency, Washington, D.C.

[21] Appl. No.: 620,127

[22] Filed: Nov. 30, 1990

Related U.S. Application Data

[63] Continuation-in-part of Ser. No. 515,892, Apr. 27, 1990.

[51] Int. Cl.$^5$ .............................................. C10G 17/00
[52] U.S. Cl. ..................... 208/262.5; 208/262.1; 208/13; 210/909; 134/10; 134/26; 134/27; 134/28; 134/42; 423/659; 423/DIG. 20; 502/25; 502/27; 502/515
[58] Field of Search ............... 134/26, 27, 28, 42; 208/262.1, 262.5; 210/909; 502/515, 25, 27; 423/659, DIG. 20

[56] References Cited

U.S. PATENT DOCUMENTS

| | | |
|---|---|---|
| 4,246,255 | 12/1981 | Grantham . |
| 4,327,027 | 4/1982 | Howard .................. 260/340 |
| 4,337,368 | 6/1982 | Pytlewski et al. ............ 568/730 |
| 4,349,380 | 9/1982 | Pytlewski et al. ............ 75/117 |
| 4,351,718 | 9/1982 | Brunelle .................. 208/262 |
| 4,353,793 | 10/1982 | Brunelle .................. 208/262 |
| 4,400,552 | 8/1983 | Pytlewski .................. 568/715 |
| 4,417,977 | 11/1983 | Pytlewski et al. ........... 208/262 |
| 4,430,208 | 2/1984 | Pytlewski et al. ........... 208/262 |
| 4,447,541 | 5/1984 | Peterson .................. 435/170 |
| 4,460,797 | 7/1984 | Pytlewski et al. ........... 568/715 |
| 4,471,143 | 9/1984 | Pytlewski et al. ........... 568/715 |
| 4,483,716 | 10/1984 | Heller .................... 137/7 |
| 4,523,043 | 1/1985 | Pytlewski et al. ........... 568/910 |
| 4,574,013 | 3/1986 | Peterson .................. 134/2 |
| 4,602,994 | 6/1986 | Pytlewski et al. ........... 208/262 |
| 4,631,183 | 12/1986 | Lalancette et al. . |
| 4,663,027 | 5/1987 | Mendiratta ............... 208/262 |
| 4,675,464 | 6/1987 | Rogers et al. ............. 585/538 |
| 4,685,220 | 8/1987 | Meenan ................... 34/10 |
| 4,761,221 | 8/1988 | Rossi .................... 208/262 |
| 4,792,407 | 12/1988 | Zeff et al. ............... 210/748 |
| 4,793,937 | 12/1988 | Meenan ................... 310/171 |
| 4,801,384 | 1/1989 | Steiner .................. 134/42 |
| 4,841,998 | 6/1989 | Bruya ................... 210/909 |
| 4,869,825 | 9/1989 | Steiner . |

FOREIGN PATENT DOCUMENTS

118858 9/1984 European Pat. Off. .

OTHER PUBLICATIONS

*Chemical Abstracts*, vol. 82, No. 139620p (1975).
Kornel et al., *Journal of Hazardous Materials*, 12 (1985), pp. 161–176.

Primary Examiner—Helane E. Myers

[57] ABSTRACT

A method for the decomposition of halogenated and non-halogenated organic contaminant compounds contained in a contaminated medium comprises adding an alkali or alkaline earth metal carbonate, bicarbonate or hydroxide to the contaminated medium in an aqueous solution or in a solvent having a boiling point of at least 200° C., or in the form of a solid dispersion or suspension. The medium includes a hydrogen donor compound. The hydrogen donor compound may be originally contained in the medium or may be added to the medium. The medium further includes a catalytic source of carbon, for example, a carabohydrate, which will cause formation of a free radical hydrogen ion from the hydrogen donor compound. The medium is heated to dehydrate the medium and then is further heated at a temperature between about 200° and 400° C. to cause formation of the free radical hydrogen ion and effect reductive decomposition of the halogenated and non-halogenated organic contaminant compounds. An acid is then added to the medium in an amount sufficient to neutralize the same.

23 Claims, No Drawings

METHOD FOR THE BASE-CATALYZED DECOMPOSITION OF HALOGENATED AND NON-HALOGENATED ORGANIC COMPOUNDS IN A CONTAMINATED MEDIUM

RELATED APPLICATIONS

This application is a continuation-in-part of the Rogers et al copending application Ser. No. 07/515,892 filed Apr. 27, 1990.

FIELD OF THE INVENTION

The present invention relates to a method for the base-catalyzed decomposition of halogenated and non-halogenated organic contaminant compounds contained in a contaminated medium. More particularly, the invention relates to a method for both the decomposition and removal of halogenated and non-halogenated organic compounds contained in a contaminated medium by use of an alkali or alkaline earth metal carbonate, bicarbonate or hydroxide, and an organic hydrogen donor compound in the presence of a carbohydrate.

BACKGROUND OF THE INVENTION

The hazards to public health and the environment which are posed by a variety of synthetic halogenated organic compounds are well known. Compounds such as polychlorinated biphenyls (PCB's), dibenzodioxins, dibenzofurans, dichlorodiphenyl trichloroethane (DDT), dieldrin, lindane and chlordane, as well as other halogenated pesticides, have been found to be persistent, environmentally toxic materials which require safe and efficient means of disposal. PCB's pose a particularly serious disposal problem. Once widely used as dielectric fluid additives in electrical equipment such as transformers and capacitors because of their excellent insulating properties, the use of PCB's in many applications has been banned by the U.S. Environmental Protection Agency owing to the cumulative storage of PCB's in the human body and the extremely high toxicity of PCB's. Thus, methods for the removal and/or destruction of halogenated organic compounds such as PCB's are required.

Various methods for the destruction or decomposition of halogenated organic compounds are known in the art. For example, the Peterson U.S. Pat. Nos. 4,447,541 and 4,574,013 disclose methods for decontaminating soil which is contaminated with halogenated organic compounds. The Peterson U.S. Pat. No. 4,447,541 discloses a process in which a reagent mixture of an alkaline constituent and a sulfoxide catalyst (DMSO) are intimately mixed with soil contaminated with PCB's. The reagent mixture affects a desorption of the halogenated contaminants from the soil and subsequently dehalogenates the contaminants. However, this process is disadvantageous in that the kinetics are relatively slow and therefore reduction of the PCB concentration to an acceptable level requires extended time periods ranging from weeks to months, the soil must be completely dry for the destruction to take place, large quantities of the reagent are required, and the sulfoxide catalyst may potentially transport contaminants prior to their destruction. The Peterson U.S. Pat. No. 4,574,013 discloses a process wherein a heated slurry of contaminated soil is treated with a mixture of an alkaline constituent and a sulfoxide catalyst. However, this process is similarly disadvantageous in that the sulfoxide catalyst may transport contaminants into living systems, and the sulfoxide catalyst produces odorous compounds when heated to high temperatures and decomposes into combustible byproducts under elevated temperature conditions. This process is also disadvantageous in that it requires large amounts of reagents.

The Rogers et al U.S. Pat. No. 4,675,464 discloses a method for the chemical destruction of halogenated aliphatic hydrocarbons, and more particularly a method for the chemical destruction of ethylene dibromide. An alkali metal hydroxide is dissolved in an ethylene glycol and the resulting product is reacted with the halogenated hydrocarbon. Rogers et al further disclose that the reaction temperature should be maintained at 30° C. or less to maintain the reaction products in solution.

The Rogers et al copending application Ser. No. 07/350,425 discloses a method for the destruction of halogenated organic compounds in a contaminated medium wherein an aqueous solution containing from about 0.1 to about 20 weight percent polyethylene glycol is added to a contaminated medium. An alkali metal hydroxide is also added to the contaminated medium, and the contaminated medium is heated at a temperature and for a time sufficient to dehydrate the medium. The medium is further heated at a temperature of between about 100° and 350° C. for a time sufficient to effect destruction of the halogenated organic compounds, and an acid is added to the medium in an amount sufficient to provide the medium with a pH of from about 7 to about 9.

The Rogers et al copending application Ser. No. 07/515,892 discloses a method for the decomposition of halogenated organic compounds contained in a contaminated medium wherein an aqueous solution of an alkali metal carbonate or bicarbonate is added to the contaminated medium, and the medium is heated to a temperature between about 250° and 400° C.

The Pytlewski et al U.S. Pat. No. 4,400,552 discloses a method for the decomposition of halogenated organic compounds which employs a reagent comprising the product of the reaction of an alkali metal hydroxide with a polyglycol or a polyglycol monoalkyl ether, and oxygen. The Pytlewski et al U.S. Pat. Nos. 4,337,368 and 4,602,994 disclose similar methods of decomposing halogenated organic compounds. Additionally, the Pytlewski et al U.S. Pat. Nos. 4,430,208, 4,417,977, 4,460,797 and 4,471,143 also disclose methods for separation and/or decomposition of halogenated organic compounds. However, these methods are disadvantageous in that excess amounts of the alkali metal hydroxide and polyglycol reagents are required in order to obtain a homogeneous distribution throughout the contaminated material, for example soil, sediment, sludge or the like, which is treated. The Pytlewski et al U.S. Pat. Nos. 4,349,380 and 4,523,043 disclose the use of reagents made from an alkali metal or alkali metal hydroxide and a polyglycol or a polyglycol monoalkyl ether for removing metals from metal-containing materials and for decomposing organo sulfur compounds, respectively. Similarly, the Brunelle U.S. Pat. Nos. 4,351,718 and 4,353,793 disclose methods for removing polyhalogenated hydrocarbons from nonpolar organic solvent solutions by treating the contaminated solutions with a mixture of polyethylene glycol and an alkali metal hydroxide. These methods are similarly disadvantageous in that excess amounts of reagent are required.

Additional methods for removing and/or destructing halogenated organic compounds contained in contaminated materials are disclosed in the Howard et al U.S. Pat. No. 4,327,027, the Heller U.S. Pat. No. 4,483,716, the Mendiratta et al U.S. Pat. No. 4,663,027, the Meenan et al U.S. Pat. Nos. 4,685,220 and 4,793,937, the Rossi et al U.S. Pat. No. 4,761,221, the Zeff et al U.S. Pat. No. 4,792,407, European Patent Application No. 118,858, *Chemical Abstracts,* Vol. 82, No. 39620P (1975) and Kornel et al, *Journal of Hazardous Materials,* 12 (1985), pages 161-176. However, many of these and additional processes known in the art for the removal and/or destruction of halogenated organic compounds in contaminated materials are inadequate in view of the time required for acceptable levels of removal and/or destruction, the use of excessive amounts of various reagents, the use of expensive reagents, the production of toxic and/or combustible byproducts, and/or the failure to obtain desired removal and/or destruction levels. Thus, a need exists for improved, cost effective methods for the removal, reduction and stripping of non-halogenated compounds from and the dehalogenation of halogenated organic compounds in contaminated materials, which methods overcome the disadvantages of the prior art.

SUMMARY OF THE INVENTION

Accordingly, it is an object of the present invention to provide new methods for the reductive decomposition and removal of halogenated and non-halogenated organic compounds contained in a contaminated medium. It is an additional object of the invention to provide methods for the reductive decomposition and removal of halogenated and non-halogenated organic compounds contained in a contaminated medium, which methods employ at least one hydrogen donor compound. It is a further object of the invention to provide methods for the decomposition and removal of halogenated and non-halogenated organic compounds contained in a contaminated medium which employ significantly less amounts of reagent and which employ lower costing reagents, as compared with prior art methods. It is a further object of the invention to provide such methods wherein environmentally acceptable levels of halogenated and non-halogenated organic contaminant compounds are achieved in the treated materials. It is a related object of the invention to provide such methods wherein the environmentally acceptable levels of contaminants in the materials are obtainable within a short period of time.

These and additional objects are achieved by the present invention which relates to methods for the base-catalyzed decomposition of halogenated and non-halogenated organic compounds contained in a contaminated medium. The methods of the invention comprise the steps of adding an alkali metal or alkaline earth metal carbonate, bicarbonate or hydroxide to a contaminated medium containing the halogenated or non-halogenated organic contaminant compounds. The alkali or alkaline earth metal carbonate, bicarbonate or hydroxide may be in an aqueous solution which distributes the metal compound throughout the medium and acts as a wetting agent, or in a solvent, or may be added as a solid dispersion or suspension. The contaminated medium further contains a hydrogen donor compound and a catalytic form of carbon which will cause formation of a free radical hydrogen ion from the organic hydrogen donor compound. For example, the organic hydrogen donor compound may comprise a high boiling point aliphatic solvent and the catalytic form of carbon may comprise a carbohydrate. Upon heating of the contaminated medium, the carbohydrate decomposes and causes formation of a free radical hydrogen ion from the hydrogen donor compound. The free radical hydrogen ion is thereby generated in situ, i.e. in the medium to be treated, and acts as the reducing agent for the halogenated and non-halogenated contaminant compounds. Accordingly, according to the methods of the present invention, the contaminated medium is then heated at a temperature and for a time sufficient to dehydrate the medium. Although the water is removed, the alkali or alkaline earth metal compound and the hydrogen donor compound are well distributed throughout the medium and are concentrated to a very reactive state. After dehydration, the medium is then further heated at a temperature between about 200° and 400° C. for a time sufficient to effect hydrogen transfer from the donor compound to the contaminants, both halogenated and non-halogenated. The reduced contaminants decompose to simple hydrocarbon structures. Decomposition of the halogenated and non-halogenated compounds in the contaminated medium is more dependent on the ease of hydrogen donation by the donor compound (which is catalyzed by the decomposed carbohydrate) as the temperature increases within the aforementioned range. Finally, an acid is added to the medium in an amount sufficient to neutralize the medium so that it may be returned to its original environment. Because the aqueous solution or solvent is employed, the amount of alkali or alkaline earth metal compound which is required for the present methods is significantly reduced as compared with prior art methods. Additionally, because the metal compound is well distributed throughout the medium by the aqueous solution, a uniform destruction or reduction of the halogenated and non-halogenated organic compounds is achieved. Moreover, because lower amounts of metal compounds are employed, recycling of excess reagents is not required. Finally, the present methods employing an alkali metal carbonate or bicarbonate are advantageous in that these compounds are less corrosive than the alkali metal hydroxides and require less acid for neutralization.

These and additional objects and advantages will become more fully understood in view of the following detailed description.

DETAILED DESCRIPTION

The present invention comprises methods for the decomposition and removal of halogenated and non-halogenated organic compounds contained in a contaminated medium. The contaminated medium may comprise soil, sludge, sediment or a liquid. The present methods are particularly adapted for use with soils, sludges and sediments. The methods are suitable for use with mediums which contain up to 100,000 ppm of halogenated organic compounds, aliphatic or aromatic, for example PCB's, or even higher levels of the halogenated organic compounds, and for use with mediums which contain up to 100,000 ppm of non-halogenated organic contaminants. The contaminated mediums which are suitable for use in the invention may also include an absorbent or adsorbent, for example spent activated carbon or the like. Additionally, the methods of the invention may be used for the treatment of pure halogenated materials, for example, aldrin, dieldrin and other halogenated pesticides.

Generally, the methods of the invention comprise adding an alkali or alkaline earth metal carbonate, bicarbonate or hydroxide, or a mixture thereof, to the contaminated medium containing one or more halogenated or non-halogenated organic contaminant compounds. The alkali or alkaline earth metal carbonate, bicarbonate or hydroxide may be added to the contaminated medium in an aqueous solution or in a high boiling solvent. Alternatively, the alkali or alkaline earth metal carbonate, bicarbonate or hydroxide may be added in the form of a solid dispersion or suspension. When the alkali or alkaline earth metal carbonate, bicarbonate or hydroxide is added in an aqueous solution, the water from the aqueous solution assists in distributing the metal compound homogeneously throughout the contaminated medium. Alternatively, if the metal carbonate, bicarbonate or hydroxide is added with a high boiling solvent, suitable solvents have a boiling point of at least 200° C., and preferably from about 200° to about 500° C. Preferred solvents include hydrocarbon compounds. In an additional embodiment, the alkali or alkaline earth metal carbonate, bicarbonate or hydroxide compound may be added to the contaminated medium in an aqueous solution, wherein the aqueous solution further contains a high boiling solvent.

The alkali or alkaline earth metal carbonate, bicarbonate or hydroxide is added to the contaminated medium in an amount of from about 1 to about 20 weight percent, based on the weight of the contaminated medium. The specific amount of metal compound which is required is dependent on the level of halogenated or non-halogenated organic contaminant compounds contained in the contaminated medium. In a preferred embodiment, the metal compound is added in an amount of from about 2 to about 12 weight percent based on the weight of the contaminated medium. The metal which forms the carbonate, bicarbonate or hydroxide reagent may be any of the alkali and alkaline earth metals, or mixtures thereof. Preferred alkali metals include lithium, sodium and potassium with sodium and potassium being particularly preferred.

The alkali and alkaline earth metal carbonates and bicarbonates are preferred for use in certain systems owing to their lower corrosive effects as compared with alkali and alkaline earth metal hydroxides. However, the hydroxide compounds are preferred for use in systems where the contaminated medium is acidic in nature or comprises a hydrocarbon material.

In accordance with an important feature of the invention, the contaminated medium further contains a hydrogen donor compound. The hydrogen donor compound provides hydrogen atoms for reaction with the halogenated and non-halogenated contaminants. The resulting reduced reaction products decompose to simple hydrocarbon structures. The hydrogen donor compound comprises an organic compound and may be originally contained in the contaminated medium together with the halogenated or non-halogenated contaminant. If the contaminated medium does not already contain a hydrogen donor compound, the hydrogen donor compound may be added to the contaminated medium together with the alkali or alkaline earth metal carbonate, bicarbonate or hydroxide. In one embodiment, the hydrogen donor compound may comprise the high boiling solvent in which the alkali or alkaline earth metal compound is added to the contaminated medium. Suitable hydrogen donor compounds include fatty acids, aliphatic alcohols or hydrocarbons, amines and the like. In order to activate these compounds to produce free radical hydrogen, a source of carbon must be added either in solution or suspension. An inexpensive carbon source which is water soluable and suitable for use in the invention comprises a carbohydrate, for example sucrose.

After addition of the alkali or alkaline earth metal compound, the contaminated medium containing the hydrogen donor compound is heated at a temperature and for a time sufficient to totally dehydrate the medium, i.e., to remove 100 weight percent of the water contained therein. This heating step may be performed at atmospheric pressure or at reduced or elevated pressures if so desired. As noted above, the water which is included in the aqueous solution allows homogeneous distribution of the alkali or alkaline earth metal compound throughout the medium and acts as a wetting agent and a penetrant. Moreover, when the water is removed from the medium during the dehydration step, the metal compound is then concentrated to a very reactive state yet is well distributed throughout the contaminated medium. As will be apparent, when the contaminated medium is a liquid, addition of the metal compound in solution is not required for even distribution of the compound throughout the medium.

After dehydration, the medium is further heated at a temperature between about 200° and 400° C. for a time sufficient to effect reductive decomposition of the halogenated and non-halogenated organic contaminant compounds. More preferably, the medium is heated at a temperature between about 280° and 350° C. to effect reductive decomposition of the halogenated and non-halogenated organic compounds. This step may be conducted at atmospheric pressure or at reduced or elevated pressures. The time required for decomposition of the halogenated organic compounds similarly depends upon the level of such compounds in the contaminated material. Generally however, a time period of from about 0.5 to about 2 hours is sufficient.

When the contaminated medium is heated at a temperature of from 200° to 400° C., the carbon source (i.e., a carbohydrate such as sucrose) acts as a catalyst for the formation of a reactive hydrogen ion from the hydrogen donor compound. This catalyzed reaction is represented by the following reaction formula:

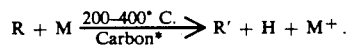

wherein R is the hydrogen donor compound, M is the metal compound, Carbon* is the source of carbon, for example a carbohydrate, and H is the free radical hydrogen. The reactive free radical hydrogen ion then reacts with the halogenated organic contaminant compounds contained in the contaminated medium according to the following reaction:

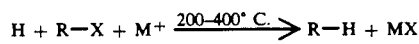

wherein R-X is the halogenated organic contaminant, X being the halogen atom, and R-H is the reduced form of the contaminant compound.

Thus, the alkali or alkaline earth metal carbonate, bicarbonate or hydroxide catalyzes the dehalogenation and reduction of both the halogenated and non-halogenated contaminants.

Finally, the medium is treated with an acid for neutralization. Preferably, the acid is added in amount sufficient to provide the medium with a pH value of from about 7 to about 9. Suitable acids for use in the invention comprise sulfuric acid, phosphoric acid, hydrochloric acid and nitric acid. With the exception of hydrochloric acid, these acids not only neutralize the medium but also provide valuable soil fertilizers, for example $Na_2SO_4$ or sodium sulfate from use of sulfuric acid, $NaH_2PO_4$, $Na_2HPO_4$, $Na_3PO_4$ or sodium phosphates from the use of phosphoric acid, and $NaNO_3$ or sodium nitrate from the use of nitric acid, given that sodium is employed as the alkali metal. If potassium is used, then the potassium salts are produced. The resulting medium may then be safely returned to its original environment if desired.

In an alternate embodiment of the methods of the present invention, halogenated and non-halogenated contaminants which may be stripped from contaminated mediums are collected in a condensate and extracted in high boiling point oil. The contaminants may then be destroyed by use of the present methods wherein an alkali or alkaline earth metal carbonate, bicarbonate or hydroxide, a hydrogen donor compound and a carbon source are added to the contaminant and the resulting mixture is heated at a temperature of 200° to 400° C.

Generally, oxygen is not a detriment to the methods of the present invention and therefore air need not be excluded. When applied to the decontamination of hydrocarbon fluids, either aliphatic or aromatic, it may be desirable to exclude air in order to prevent ignition of the hydrocarbon. Thus, the present methods may be performed either in the presence or the absence of an oxygen-containing atmosphere.

Because the present methods employ relatively small amounts of alkali or alkaline earth metal compounds, and solvent if used, there is no need to recover excess reagents for reuse. Moreover, because the present invention employs water to wet the contaminated medium and to distribute the alkali or alkaline earth metal compounds therein, the present methods are significantly less costly than prior art methods which employ polyethylene glycol to wet the contaminated medium. The present methods may be performed in either a continuous or a batch system, and, if desired, all steps may be performed in a single reactor. As will be demonstrated in the Examples, the methods of the invention decompose the halogenated organic compounds, particularly haloaromatic, and cyclic aliphatic compounds, to nondetectable levels. Additionally, the products of the present methods are non-mutagenic, non-teratogenic and non-toxic to life forms.

Moreover, the base-catalyzed decomposition methods according to the present invention are advantageous in that decomposition of both halogenated and non-halogenated contaminant compounds is achieved to higher degrees in less time as compared with the prior art methods employing reagents derived from the reaction of alkali metal hydroxides and polyethylene glycol. The methods according to the present invention are also advantageous over such prior art methods in that the prior art methods could not be employed to effectively decompose or remove non-halogenated organic contaminants from contaminated mediums.

The methods of the present invention are demonstrated in the following Examples:

EXAMPLE 1

This example demonstrates the application of the methods according to the present invention to a contaminated liquid material. Fifty ml of a contaminated high boiling aliphatic solvent material containing 10% aldrin was mixed with an aqueous solution formed from 10 grams of sodium bicarbonate and 10 ml of water containing 1 gram of sucrose. The solvent material served as the hydrogen donor compound. The mixture was agitated by stirring and was heated to 290° to 320° C. for approximately one to two hours. The aldrin concentration rapidly fell to below detectable limits, thus resulting in an aldrin-free solvent.

EXAMPLE 2

This example demonstrates the application of the methods according to the present invention to treatment of contaminated soil. One hundred grams of contaminated soil containing 2,200 ppm Aroclor 1260, 1,000 ppm Aroclor 1242, 1,000 ppm of pentachlorophenol, 1,000 ppm of dieldrine, 1,000 ppm of lindane and 500 ppm of the non-halogenated compound 2-phenylnaphthalene were supplied to a chemical reactor system. Approximately 5 grams of sodium bicarbonate (5 weight percent of the contaminated medium) and one ml of a high boiling point aliphatic hydrocarbon solvent were added to the soil in a solution of 20 ml of water containing 1 gram of sucrose. The solvent served as the hydrogen donor compound. The resulting mixture was slurried and heated such that the water contained in the system was distilled off. The reaction system was then further heated to a temperature of approximately 290° to 340° C. for a period of from 0.25 to 1.5 hours. At about 0.25 hours and a temperature of 340° C., residuals in the soil were less than one ppm for all pollutants. The 2-phenylnaphthalene was reduced to a cyclic hydrocarbon which distilled out of the reaction flask.

EXAMPLE 3

This example further demonstrates the reducing power of the present methods applied to a polychlorinated biphenyl mixture. To a 50 ml portion of a high boiling aliphatic solvent (Boiling Point Range 340°-390° C.) was added 1.0 gram of neet Aroclor 1260. This material was placed in a 200 ml round bottom flask equipped with stirrer, and 5 grams of sodium hydroxide and 2 grams of sucrose were added. The flask was also equipped with a fractionating column and condenser with receiver. The contents of the flask were heated to 350° C. for 2 hours, after which the contents of the flask were cooled and sampled for residual PCB's. No polychlorinated biphenyls were detected in this residual oil. A trace of biphenyl was detected.

The condensate from this reaction which consisted of approximately 1.2 ml of water and 2 ml of an oily material were also tested for PCB's. The major compound in the condensate was biphenyl with some minor trace quantities of mono- and di-chlorobiphenyls. Further, the condensate contained low boiling (100°-200° C.) aliphatic materials which were generated from the high boiling point aliphatic solvent.

Thus, the methods of the present invention are advantageous for both destruction and removal of halogenated and non-halogenated organic compounds from a contaminated medium. The methods of the present invention employ relatively inexpensive compounds, namely, the alkali or alkaline earth metal carbonates, bicarbonates and hydroxides, optionally high boiling hydrocarbon solvents, and a catalytic form of carbon obtained from a carbohydrate. The reagents are employed in relatively small amounts as compared with methods of the prior art. Additionally, the alkali or alkaline earth metal carbonates and bicarbonates employed in the methods of the present invention are less corrosive than the alkali and alkaline earth metal hydroxides, although as noted above, the hydroxides may be required in some instances. Thus, the methods of the present invention provide an improved process for destroying or reducing halogenated and non-halogenated compounds to non-detectable levels. The products produced by the present methods are simple lower molecular weight materials, for example, hydrocarbons, alkanes, alcohols and the like, which are non-mutagenic, non-teratogenic and non-toxic to life forms.

The preceding examples are set forth to illustrate specific embodiments of the invention, and are not intended to limit the scope of the methods of the present invention. Additional embodiments and advantages within the scope of the claimed invention will be apparent to one of ordinary skill in the art.

What is claimed is:

1. A method for the reductive decomposition of halogenated or non-halogenated organic contaminant compounds contained in a contaminated medium, comprising
   (a) adding an alkali or alkaline earth metal carbonate, bicarbonate or hydroxide to a contaminated medium containing halogenated or non-halogenated organic contaminant compounds, said alkali or alkaline earth metal carbonate, bicarbonate or hydroxide being added as an aqueous solution or as a suspension in a solvent having a boiling point of at least 200° C., or in the form of a solid suspension, said contaminated medium further containing a hydrogen donor compound and a catalytic form of carbon which will form a free radical hydrogen ion;
   (b) heating the contaminated medium at a temperature and for a time sufficient to dehydrate the medium;
   (c) further heating the medium at a temperature between about 200° and 400° C. for a time sufficient to cause formation of a free radical hydrogen ion therein and effect reductive decomposition of the halogenated or non-halogenated organic contaminant compounds; and
   (d) adding an acid to the medium in an amount sufficient to provide the medium with a pH of from about 7 to about 9.

2. A method as defined in claim 1, wherein the alkali or alkaline earth metal compound is added in an aqueous solution.

3. A method as defined in claim 2, wherein the aqueous solution further contains a hydrocarbon solvent having a boiling point of at least 200° C.

4. A method as defined in claim 1, wherein the alkali or alkaline earth metal compound is added as a suspension in a solvent having a boiling point of at least 200° C.

5. A method as defined in claim 4, wherein the solvent comprises a hydrocarbon compound.

6. A method as defined in claim 1, wherein the alkali or alkaline earth metal compound is added as a solid suspension.

7. A method as defined in claim 1, wherein the alkali or alkaline earth metal compound is added in an amount of from about 1 to about 20 weight percent based on the weight of the contaminated medium.

8. A method as defined by claim 7, wherein the alkali or alkaline earth metal compound is added in an amount of from about 2 to about 12 weight percent based on the weight of the contaminated medium.

9. A method as defined by claim 1, wherein the catalytic form of carbon comprises a carbohydrate which decomposes to form a free radical hydrogen ion from the hydrogen donor compound.

10. A method as defined by claim 9, wherein the carbohydrate comprises sucrose.

11. A method as defined by claim 1, wherein the contaminated medium is heated under vacuum to dehydrate the medium.

12. A method as defined by claim 1, wherein in step (c) the medium is further heated at a temperature between about 280° and 400° C. to effect reductive decomposition of the organic contaminant compounds.

13. A method as defined by claim 1, wherein the acid which is added to the medium to provide a pH of from 7 to about 9 is selected from the group consisting of sulfuric acid, phosphoric acid, hydrochloric acid and nitric acid.

14. A method as defined by claim 1, wherein the contaminated medium comprises soil.

15. A method as defined by claim 1, wherein the contaminated medium comprises sludge.

16. A method as defined by claim 1, wherein the contaminated medium comprises sediment.

17. A method as defined by claim 1, wherein the contaminated medium includes an absorbent comprising spent activated carbon.

18. A method as defined by claim 1, wherein the contaminated medium comprises a liquid.

19. A method as defined by claim 1, wherein the contaminated medium contains up to 100,000 ppm of halogenated organic compounds.

20. A method as defined by claim 1, wherein the contaminated medium comprises a pure halogenated material.

21. A method as defined by claim 1, wherein the medium which results from the acid addition step is returned to its original environment.

22. A method as defined by claim 1, wherein the contaminated medium originally contains the hydrogen donor compound.

23. A method as defined by claim 1, wherein the hydrogen donor compound is added to the contaminated medium.

* * * * *